United States Patent
Takabatake

(10) Patent No.: US 6,247,287 B1
(45) Date of Patent: *Jun. 19, 2001

(54) STRUCTURE AND METHOD FOR CLOSING AND REINFORCING HOLLOW STRUCTURAL MEMBERS

(75) Inventor: Yoshihiro Takabatake, Aichi-ken (JP)

(73) Assignee: Neo-Ex Lab, Inc., Aichi-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,228

(22) Filed: Aug. 5, 1998

(51) Int. Cl.$^7$ .............................. B60R 21/02; B62D 25/04; B29C 67/20

(52) U.S. Cl. ........................ 52/731.6; 52/735.1; 264/46.6; 296/188

(58) Field of Search .................. 264/46.4, 46.5, 264/46.6, 46.7; 296/187, 188, 203.01; 52/735.1, 731.6

(56) References Cited

U.S. PATENT DOCUMENTS

| | | | |
|---|---|---|---|
| 3,834,962 | * 9/1974 | Strumbos | 264/46.5 |
| 4,357,013 | * 11/1982 | Fernandez et al. | 264/46.6 |
| 5,160,465 | 11/1992 | Soderberg . | |
| 5,631,027 | 5/1997 | Takabatake . | |
| 5,642,914 | 7/1997 | Takabatake . | |
| 5,649,400 | 7/1997 | Miwa . | |
| 5,800,896 | 9/1998 | Kobayashi . | |
| 5,806,915 | 9/1998 | Takabatake . | |

FOREIGN PATENT DOCUMENTS

| | | |
|---|---|---|
| 1141140 | 6/1989 | (JP) . |
| 6156317 | 6/1994 | (JP) . |
| 7232664 | 9/1995 | (JP) . |
| 8127298 | 5/1996 | (JP) . |
| 9702967 | 1/1997 | (WO) . |

* cited by examiner

Primary Examiner—Michael Safavi
(74) Attorney, Agent, or Firm—Dennison, Scheiner, Schultz & Wakeman

(57) ABSTRACT

A structure for closing a cavity of a hollow structural member and for reinforcing the hollow structural member. The structure includes a reinforcement member comprising a plurality of reinforcement plates arranged in a spaced relationship. The reinforcement plates being interconnected to form at least one receiving space therebetween. The reinforcement member being disposed in the cavity in such a way that the reinforcement plates are substantially perpendicular to the longitudinal axis of the hollow structural member. At least one foamable member is received in the at least one receiving space of the reinforcement member. The foamable member being adapted to close the cavity and to secure the reinforcement member in the cavity when expanded by external heating.

14 Claims, 8 Drawing Sheets

STRUCTURE AND METHOD FOR CLOSING AND REINFORCING HOLLOW STRUCTURAL MEMBERS

BACKGROUND OF THE INVENTION

1. Field of the Invention

The present invention relates to structures for closing a cavity of a hollow structural member and for reinforcing the hollow structural member (hereinafter "structures for closing and reinforcing a hollow structural member"), and to methods for closing the cavity of the hollow structural member and for reinforcing the hollow structural member (hereinafter "methods for closing and reinforcing a hollow structural members"). More particularly, the present invention relates to structures and methods for closing and reinforcing a closed box-like hollow structural member constructed from a plurality of plates, such as a front pillar and a center pillar of a vehicle, to increase the damping and sound insulating powers of the hollow structural member and to increase the strength and rigidity of the hollow structural member.

2. Description of the Related Art

FIGS. 8(A), 8(B), 9(A) and 9(B) show examples of a known structure for closing cavities 206a and 206b of a hollow structural member or pillar 201 of a vehicle body and for reinforcing the pillar 201. As shown in these drawings, the pillar 201 is constructed from an inner panel 202, an outer panel 204 and an Intervening reinforcement panel 208. The cavities 206a and 206b are formed in the spaces between these panels. In this structure, four plate-like foamable pads 221 are initially disposed in the cavities 206a and 206b in an unfoamed state. In this state, the unfoamed pads are in a compressed state and can be expanded by exposing to heat. The foamable pads 221 each have a desired length and are adhered, by adhesive, to the inner surfaces of the inner 202 and outer panels 204 and both surfaces of the reinforcement panel 208, respectively.

As shown in FIG. 8(B), obstruction plates 231 are disposed in the cavities 206a and 206b. The obstruction plates 231 are secured to the inner panel 202 and to the reinforcement panel 208 by spot welding or other such methods. The obstruction plates 231 have profiles that substantially conform to the transverse cross-sectional configurations of the cavities 206a and 206b, respectively. As will be appreciated, the foamable pads 221 are positioned adjacent to the obstruction plates 231.

As shown in FIGS. 9(A) and 9(B), when the pillar 201 is heated by external heating, the foamable pads 221 expand to produce foamed products 222. As will be recognized, the obstruction plates 231 may be used to effectively prevent the foamable pads 221 from expanding downward. The foamed products 222 thus formed fill the cavities 206a and 206b and reinforce the pillar 201, thereby increasing the damping and sound insulating powers of the pillar 201 and increasing the strength and rigidity of the pillar 201.

However, in the above-described known structure, to sufficiently increase the strength and the rigidity to the pillar 201, the foamable pads 221 must be significantly increased in size, so that the foamed products 222 may extend to greater than a desired length in the cavities 206a and 206b. Additionally, the foamable pads 221 preferably should be made of special foamable materials, so that the foamed products 222 have sufficient rigidity or hardness when they are cured in the cavities 206a and 206b. These requirements may lead to increased costs.

Further, in the known structure, the foamable pads 221 must be adhered to the inner and outer panels 202 and 204 and the reinforcement panel 208 by adhesive prior to heating. The obstruction plates 231 also must be mounted on the inner panel 202 and the reinforcement panel 208 prior to heating, which are rather troublesome and time-consuming operations.

Further, the pillar 201 may have some un-painted portions, which un-painted portions result from the fact that the foamable pads 221 are adhered to the inner and outer panels 202 and 204 and the reinforcement panel 208 prior to painting. Such un-painted portions on the pillar 201 are therefore susceptible to corrosion.

Moreover, as generally shown in FIG. 9(B), the inner panel 202 of the pillar 201 is formed with a plurality of apertures 232 (only one of which is shown) for attaching an ornament or other decorative member (not shown) to the pillar 201. In the known structure, the apertures 232 may be closed by a portion 222a of the foamed products 222, because the foamed products 222 may expand over a considerably prolonged extent. Closure of the apertures 232 by the foamed products 222 may prevent engagement pins (not shown) provided on the ornament from engaging the apertures 232, thereby preventing the ornament from being mounted on the pillar 201.

SUMMARY OF THE INVENTION

It is an object of the present teachings to provide a structure and a method for closing a cavity of a hollow structural member and for reinforcing the hollow structural member in which problems associated with the known structure can be significantly reduced or eliminated.

It is another object to provide such structure and method in which the cavity of the hollow structural member can be efficiently closed without increasing the amount or bulk of a foamable pad necessary to fill or close the cavity.

It is further object to provide such structure and method in which the hollow structural member can be sufficiently reinforced without increasing the amount or bulk of a foamable pad.

In order to attain these objects, multiple structures and methods are provided. Structures for filling and closing a cavity of a hollow structural member and for reinforcing the hollow structural member, which structures include a reinforcement member comprising a plurality of reinforcement plates arranged in a spaced relationship, the reinforcement plates being interconnected to form at least one receiving space therebetween, the reinforcement member being disposed in the cavity in such a way that the reinforcement plates are substantially perpendicular to the longitudinal axis of the hollow structural member, and at least one foamable member received in the at least one receiving space within the reinforcement member, the foamable member being adapted to partially or completely fill the cavity and to secure the reinforcement member in the cavity when the foamable member is expanded by external heating to produce a foamed product. Preferably, the foamable members are placed so as to close the cavity when expanded.

In addition, structures for closing a cavity of a hollow structural member and for reinforcing the hollow structural member are provided in which the cavity is longitudinally divided into a first divided cavity and a second divided cavity, which structure includes a reinforcement member comprising a plurality of reinforcement plates arranged in a spaced relationship, the reinforcement plates being interconnected to form at least one receiving space therebetween, the reinforcement member being disposed in at least one of the first and second divided cavities in such a way that the reinforcement plates are substantially perpendicular to the longitudinal axis of the hollow structural member, and at least one foamable member received in the at least one receiving space of the reinforcement member, the foamable member being adapted to partially or completely fill the corresponding divided cavity and to secure the reinforcement member in the divided cavity when the foamable member is expanded by external heating to produce a foamed product.

Further, methods are provided for closing a cavity of a hollow structural member and for reinforcing the hollow structural member, which methods comprise the steps of providing a reinforcement member comprising a plurality of reinforcement plates arranged in a spaced relationship, the reinforcement plates being interconnected to form at least one receiving space therebetween, disposing the reinforcement member in the cavity in such a way that the reinforcement plates are substantially perpendicular to the longitudinal axis of the hollow structural member, inserting at least one foamable member into the at least one receiving space of the reinforcement member, and expanding the foamable member by external heating to produce a foamed product, thereby partially or completely filling the cavity and securing the reinforcement member in the cavity.

With these structures and methods, the cavity of the hollow structural member can be filled without increasing the amount or bulk of the foamable member necessary to effectively reduce noises and sounds. Therefore, the cavity of the hollow structural member can be filled at a relatively low cost.

Also, the hollow structural member can be sufficiently reinforced without increasing the amount or bulk of the foamable member. Therefore, the hollow structural member can be reinforced at a relatively low cost.

In addition, the foamable member and the reinforcement member can be easily and speedily disposed within the cavity of the hollow structural member during the manufacture of the hollow structural member. Therefore, troublesome and time-consuming operations are minimized.

The present teachings will become more fully apparent from the following description and claims as It proceeds in connection with the drawings.

DETAILED DESCRIPTION OF THE PREFERRED EMBODIMENTS

Preferred embodiments of the invention will now be described in detail with reference to the drawings.

Figure 4A:
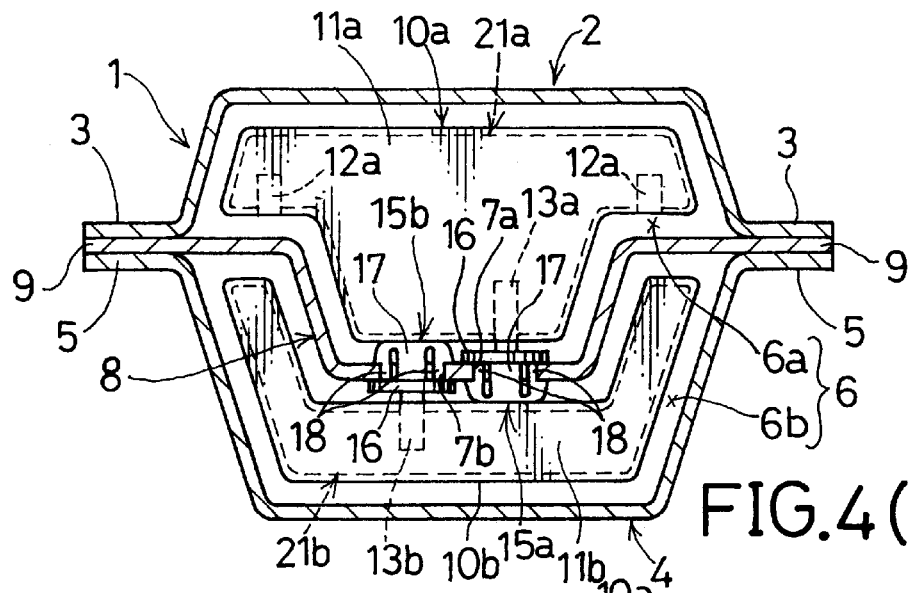
FIG. 4(A) is a sectional view taken along the line IV(A)—IV(A) in FIG. 3(A)
Figure 4B:
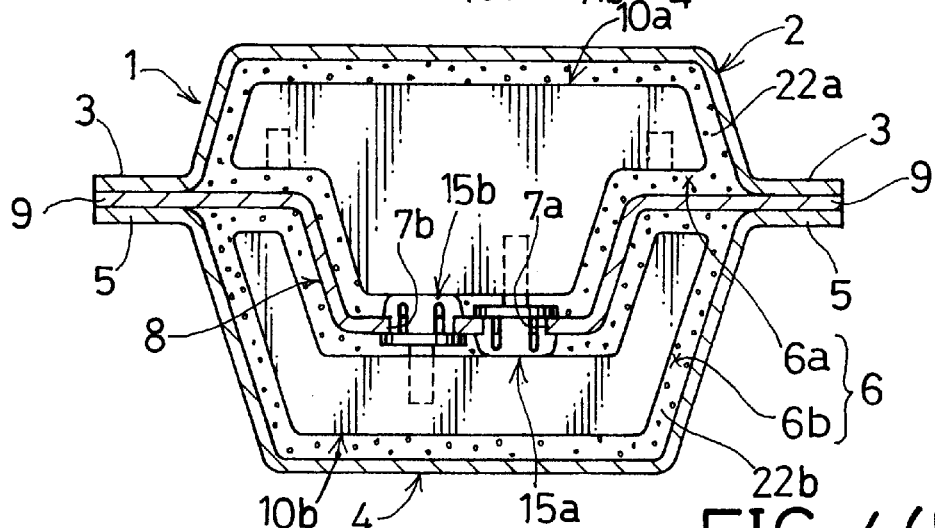
FIG. 4(B) is a sectional view taken along the line IV(B)—IV(B) in FIG. 3(B)
Figure 5:
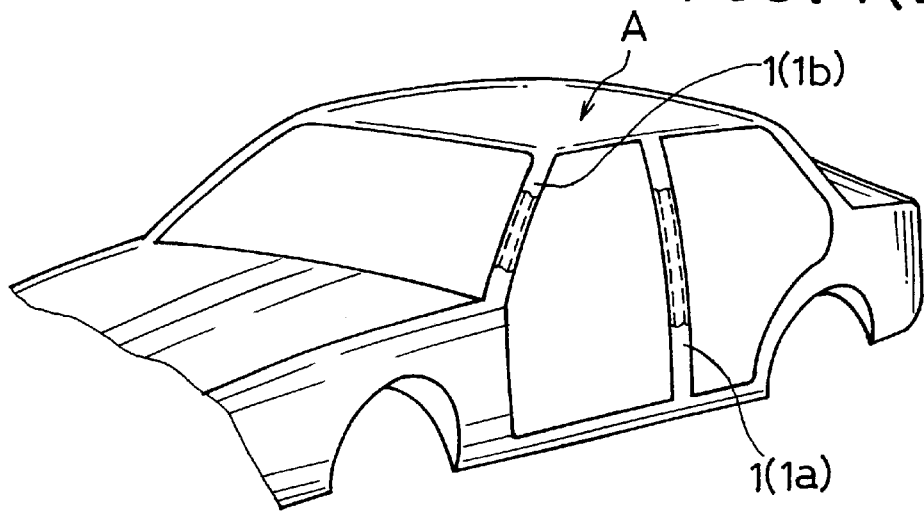
FIG. 5 is a schematic view of an automobile showing positions in which the structure may be located.

Referring to FIGS. 1 to 5, shown therein is a first embodiment of the invention. As shown in FIG. 5, a pillar 1 (for example, a center pillar 1a or a front pillar 1b) of a vehicle body A is exemplified as a hollow structural member. As best shown in FIG. 4, the pillar 1 is constructed from an elongated inner pillar panel 2 having flanges 3 extending therealong, an elongated outer pillar panel 4 having flanges 5 extending therealong, and an elongated intervening panel or reinforcement panel 8 having flanges 9 extending therealong. The inner 2 and outer pillar panels 4 and the reinforcement panel 8 preferably are welded at flanges 3, 5 and 9 by spot welding, so that the pillar 1 has an elongated closed box-like hollow shape and has a longitudinally extending cavity 6 therein. As will be recognized, the cavity 6 is longitudinally divided into a first divided cavity 6a and a second divided cavity 6b by the reinforcement panel 8.

Figure 1:
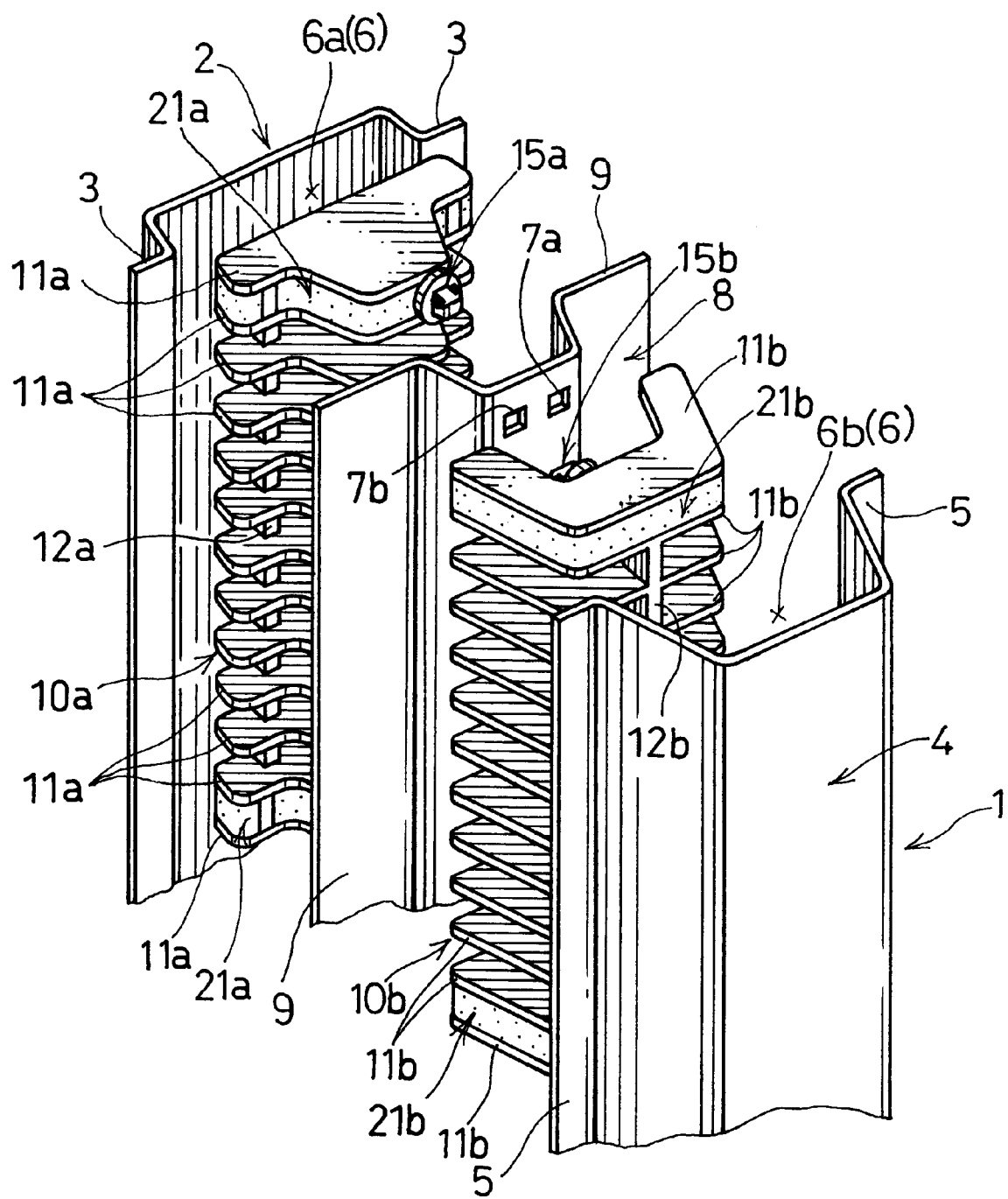
FIG. 1 is an exploded perspective view of a structure for closing and reinforcing a hollow structural member according to a first embodiment of the present invention.

As best shown in FIG. 1, the reinforcement panel 8 preferably has two pairs of apertures 7a and 7b (only one pair of which is shown) into which attachment members or engagement pins 15a and 15b are inserted, as will be hereinafter described. Each of the apertures 7a and 7b may have a desired shape, for example, a rectangular shape, an oval shape or other such shapes.

The first divided cavity 6a of the pillar 1 preferably receives a first reinforcement member 10a and a pair of first foamable members or first foamable pads 21a retained by the first reinforcement member 10a. The first foamable pads 21a retained by the first reinforcement member 10a disposed in the first divided cavity 6a may preferably fill or close the first divided cavity 6a when expanded by external heating to produce foamed products 22a. Preferably, the external heating is performed by an oven.

Similarly, the second divided cavity 6b of the pillar 1 preferably receives a second reinforcement member 10b and a pair of second foamable members or second foamable pads 21b retained by the second reinforcement member 10b. The second foamable pads 21b retained by the second reinforcement member 10b disposed in the second divided cavity 6b may preferably fill or close the second divided cavity 6b when expanded by external heating to produce foamed products 22b.

Figure 2B:
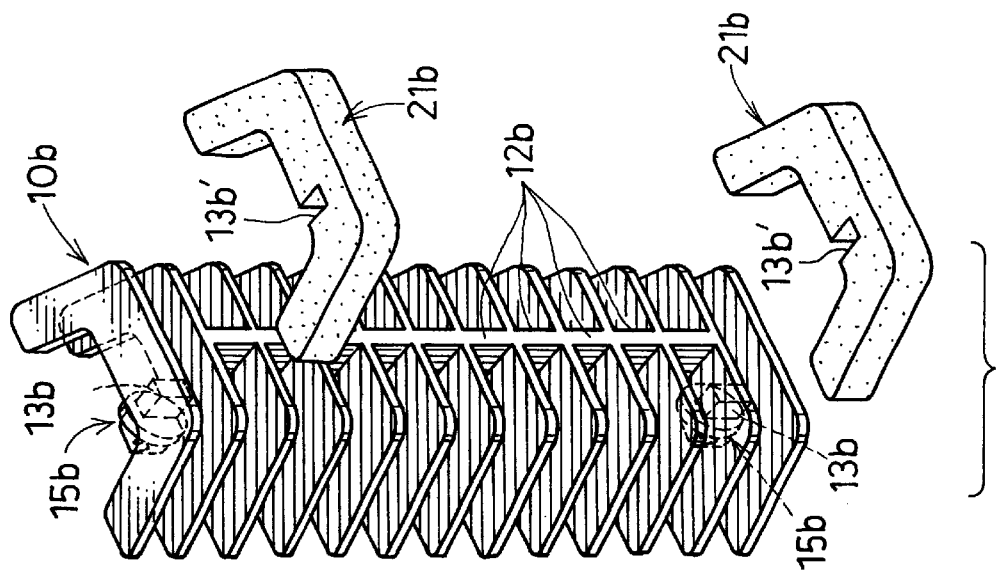
FIG. 2(B) is an exploded perspective view of a second reinforcement member and second foamable pads used in the structure.
Figure 2A:
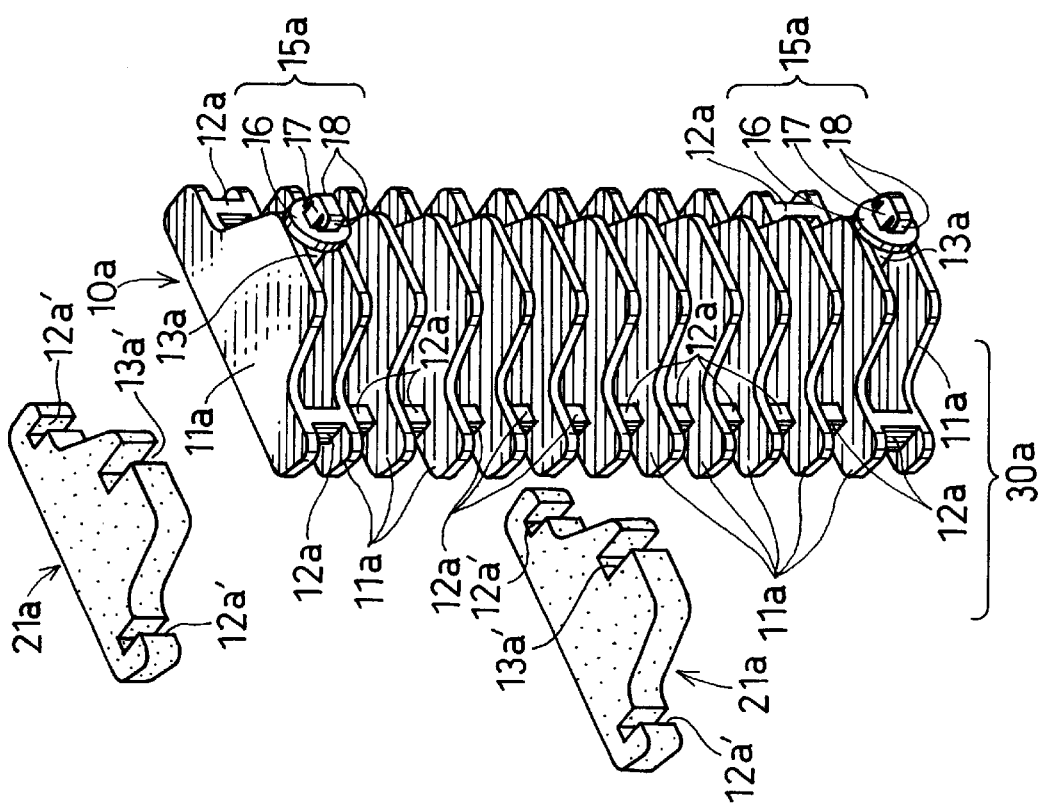
FIG. 2(A) is an exploded perspective view of a first reinforcement member and first foamable pads used in the structure.

As best shown in FIGS. 1 and 2(A), the first reinforcement member 10a is preferably constructed from a plurality of reinforcement plates 11a arranged in a row in a spaced relationship, and a plurality of spacers or connecting pieces 12a and 13a interposed between the reinforcement plates 11a. The reinforcement plates 11a can be arranged in parallel or some other relationship, and are preferably integrally interconnected with each other by the connecting pieces 12a and 13a to form a plurality of circumferentially opened receiving spaces therebetween. As a result, the first reinforcement member 10a may have a series of receiving spaces. As will be apparent, the connecting pieces 13a are only disposed between the two reinforcement plates 11a positioned on both ends of the reinforcement plate row. In addition, each reinforcement plate 11a may be configured to substantially conform to the transverse cross-sectional configuration of the first divided cavity 6a, and have an external dimension slightly smaller than the dimension of the transverse cross section of the first divided cavity 6a so as to form a substantial clearance between the periphery of the reinforcement late 11a and the surfaces of the panels 2 and 8.

The first reinforcement member 10a may further include attachment members or engagement pins 15a. Each engagement pin 15a preferably is integrally formed on the connecting piece 13a, so as to be insertable into the aperture 7a formed on the reinforcement panel 8 when the first reinforcement member la is disposed on the reinforcement panel 8, as will be hereinafter described. The engagement pin 15a includes a base 16 that is greater than the aperture 7a in length and width, a leg 17 axially projecting from a seating surface of the base 16 and preferably having a cross-sectional configuration corresponding to the configuration of the aperture 7a, and a pair of elastically deformable engagement lips 18 laterally extending from a projecting end of the leg 17. As will be appreciated, each engagement lip 18 may elastically engage a longitudinal peripheral edge of the aperture 7a to prevent the engagement pin 15a from dropping out when the leg 17 is completely forced in the aperture 7a.

The first foamable pads 21a are preferably configured to substantially conform to the configuration of the reinforcement plate 11a. One of the first foamable pads 21a is received in the receiving space between the two reinforcement plates 11a positioned on one end of the reinforcement plate row in an unfoamed state, and the other of the first foamable pads 21a is received in the receiving space between the two reinforcement plates 11a positioned on the other end of the reinforcement plate row in an unfoamed state. As will be recognized, each first foamable pad 21a preferably has a thickness equal to or smaller than the distance between the corresponding reinforcement plates 11a so as to fit snugly therebetween.

Further, each first foamable pad 21a has engagement slits 12a' and 13a' that are preferably designed to engage the connecting pieces 12a and 13a of the first reinforcement member 10a when the first foamable pad 21a is received in the receiving space between the reinforcement plates 11a.

As best shown in FIGS. 1 and 2(B), the second reinforcement member 10b preferably is constructed from a plurality of reinforcement plates 11b arranged in a row and in spaced relationship, and a plurality of spacers or connecting pieces 12b and 13b interposed between the reinforcement plates 11b. The reinforcement plates 11b may be arranged in parallel or another relationship, and may be integrally interconnected with each other by the connecting pieces 12b and 13b to form a plurality of circumferentially opened receiving spaces therebetween. As a result, the second reinforcement member 10b may have a series of receiving spaces.

As will be apparent, two connecting pieces 13b are provided, and the two reinforcement plates 11a positioned on each end of the reinforcement plate row are interconnected by each connecting piece 13b. In addition, each reinforcement plate 11b preferably is configured to substantially conform to the transverse cross-sectional configuration of the first divided cavity 6b, and may have an external dimension slightly smaller than the dimension of the transverse cross section of the first divided cavity 6b so as to form a substantial clearance between the periphery of the reinforcement plate 11b and the surfaces of the panels 4 and 8.

The second reinforcement member 10b may further include attachment members or engagement pins 15b. Each engagement pin 15b preferably is integrally formed on the connecting piece 13b, so as to be insertable into the aperture 7b formed on the reinforcement panel 8 when the second reinforcement member 10b is disposed on the reinforcement panel 8, as will be hereinafter described. The engagement pin 15b has the same construction and function as the engagement pin 15a of the first reinforcement member 10a. Therefore, no description of the engagement pin 15b is necessary.

The second foamable pads 21b preferably conform to the configuration of the reinforcement plate 11b. One of the second foamable pads 21b is received in the receiving space between the two reinforcement plates 11b positioned on one end of the reinforcement plate row in an unfoamed state, and the other of the second foamable pads 21b is received in the receiving space between the two reinforcement plates 11b positioned on the other end of the reinforcement plate row in an unfoamed state. As will be recognized, each second foamable pad 21b preferably has a thickness equal to or smaller than the distance between the corresponding reinforcement plates 11b so as to fit snugly therebetween.

Further, each second foamable pad 21b is provided with an engagement slit 13b'. The slit 13b' preferably is designed to engage the connecting piece 13b of the second reinforcement member 10b when the second foamable pad 21b is received in the receiving space between the reinforcement plates 11b.

The first and second reinforcement members 10a and 10b thus constructed preferably are integrally formed by injection molding of a heat resistive synthetic resinous material.

On the other hand, the first and second foamable pads 21a and 21b used in this representative embodiment preferably are made of foamable materials, rubber or other such materials that can be cured at temperatures from about 110° C. to 190° C. to provide closed cell type foamed products 22a and 22b and that adhere to the surfaces of the panels 2, 4 and 8 when cured. For example, the foamable materials used in this representative embodiment may be materials disclosed in Japanese Laid-Open Patent Publication No. 2-276836.

Processes for incorporating the first and second reinforcement members 10a and 10b and the first and second foamable pads 21a and 21b to the pillar 1 and subsequent operations will now be described.

The first foamable pads 21a are positioned in an unfoamed or compressed state within the receiving spaces between the corresponding reinforcement plates 11a of the first reinforcement member 10a. Slits 12a' and 13a' are preferably engaged with the connecting pieces 12a and 13a. Thus, the first foamable pads 21a are properly positioned and retained on the first reinforcement member 10a.

The first reinforcement member 10a having the first foamable pads 21a (hereinafter "first filling device or first filling assembly 30a") is disposed on one side (a side facing the inner pillar panel 2) of the reinforcement panel 8 in such a way that the reinforcement plate row of the reinforcement plates 11a aligns with the longitudinal axis of the reinforcement panel 8. In other words, the reinforcement plates 11a are aligned to be substantially perpendicular to the longitudinal axis of the reinforcement panel 8. Thereafter, the first engagement pins 15a provided on the connecting piece 13a of the first reinforcement member 10a are inserted into the apertures 7a formed on the reinforcement panel 8. As will be recognized, when the legs 17 of the first engagement pins 15a are completely forced into the apertures 7a, the engagement lips 18 engage the longitudinal peripheral edges of the apertures 7a. Thus, the first reinforcement member 10a is attached to one side of the reinforcement panel 8 together with the first foamable pads 21a.

On the other hand, the second foamable pads 21b are positioned in an unfoamed or compressed state within the receiving spaces between the corresponding reinforcement plates 11b of the second reinforcement member 10b with the slits 13b' engaged with the connecting pieces 13b. Thus, the second foamable pads 21b are properly positioned and retained on the second reinforcement member 10b.

Similar to the first reinforcement member 10a, the second reinforcement member 10b having the second foamable pads 21b (hereinafter "second filling device or second filling assembly 30b") is disposed on the other side (a side facing the outer pillar panel 4) of the reinforcement panel 8 in such a way that the reinforcement plate row of the reinforcement plates 11b aligns with the longitudinal axis of the reinforcement panel 8. Thereafter, the second engagement pins 15b provided on the connecting piece 13b of the second reinforcement member 10b are inserted into the apertures 7b formed on the reinforcement panel 8. Thus, the second reinforcement member 10b is attached to the other side of the reinforcement panel 8 together with the second foamable pads 21b.

Figure 3A:
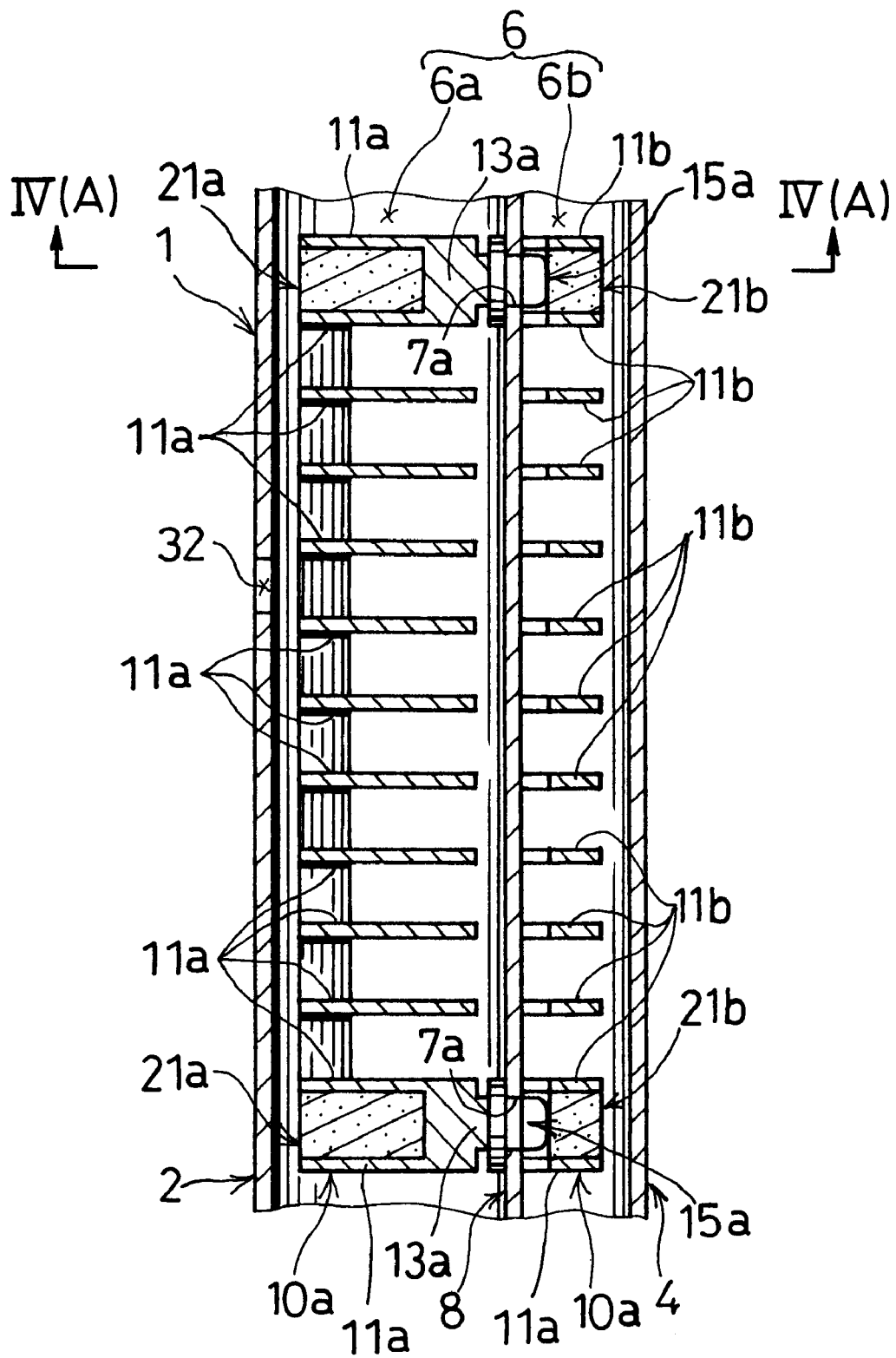
FIG. 3(A) is a vertical sectional view of the structure before the foamable pads are expanded.

Subsequently, the inner pillar panel 2, the outer pillar panel 4 and the reinforcement panel 8 are welded at flanges 3, 5 and 8 thereof by spot welding to form the pillar 1 having the first and second divided cavities 6a and 6b therein. As will be recognized, the pillar 1 thus formed includes the first and second filling assemblies 30a and 30b that are encapsulated within the first and second divided cavities 6a and 6b, respectively, because the reinforcement panel 8 has been provided with the first and second filling assemblies 30a and 30b on its both sides prior to welding. It is important to note that as shown in FIGS. 3(A) and 4(A), the first and second filling assemblies 30a and 30b may be retained in the first and second divided cavities 6a and 6b without contacting the surfaces of the panels 2, 4 and 8.

Thereafter, the vehicle body A having the pillar 1 thus constructed is introduced into a coating bath containing a coating material for dip coating. During dip coating, the coating material coats the outer surface of the pillar 1. The coating material also enters the first and second divided cavities 6a and 6b through apertures (not shown), which apertures are used to attach an ornament or decorative member (not shown) to the pillar 1. Thus, the coating material also coats the cavity surfaces of the pillar 1. As will be easily understood, the coating material introduced into the divided cavities 6a and 6b may be effectively applied to the inner surfaces of the pillar panels 2 and 4 and both surfaces of the reinforcement panel 8, because the first and second filling assemblies 30a and 30b may be retained without contacting the inner surfaces of the pillar panels 2 and 4 and both surfaces of the reinforcement panel 8. As a result, the coating material may suitably coat the cavity surfaces of the pillar 1 without producing any un-painted portions thereon.

Thereafter, the vehicle body A having the pillar 1 is heated by external heating to bake the coating material as coated, thereby effectively heating the first and second foamable pads 21a and 21b in the first and second divided cavities 6a and 6b. As a result, the heated foamable pads 21a and 21b expand to produce the foamed products 22a and 22b.

Figure 3B:
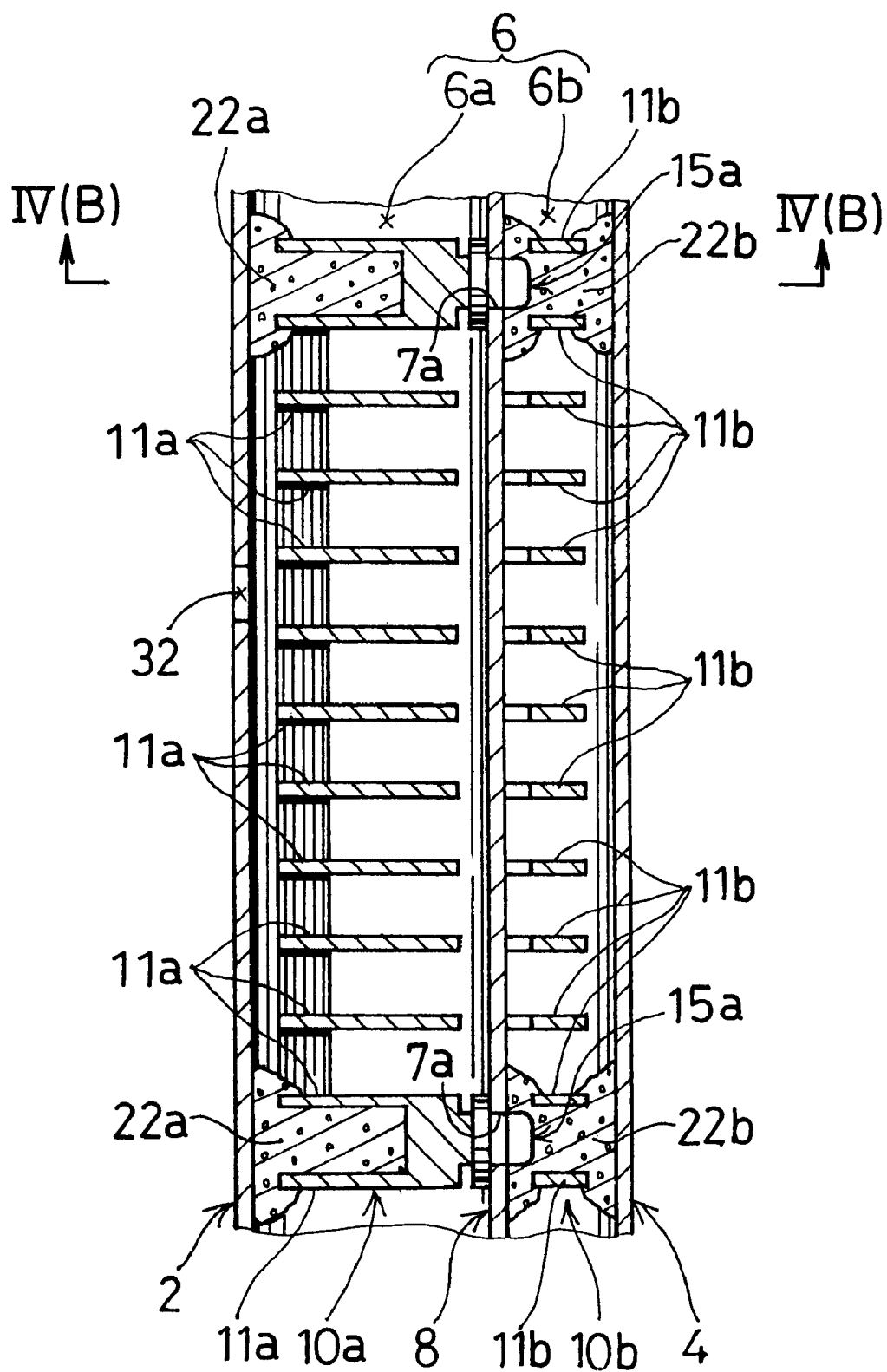
FIG. 3(B) is a vertical sectional view of the structure after the foamable. pads are expanded.

As shown In FIGS. 3(B) and 4(B), when the foamable pads 21a and 21b are expanded by heating, the corresponding reinforcement plates 11a and 11b may effectively prevent the foamed products 22a and 22b as produced from expanding in the longitudinal direction of the divided cavities 6a and 6b. Therefore, the foamed products 22a and 22b effectively expand in directions perpendicular to the longitudinal direction of the divided cavities 6a and 6b. This feature results from the fact that the foamable pads 21a and 21b are retained between the reinforcement plates 11a and 11b arranged perpendicular to the longitudinal direction of the divided cavities 6a and 6b, so that both side surfaces are restrictively covered by the reinforcement plates 11a and 11b. Therefore, the foamed products 22a and 22b reliably circumferentially adhere to the cavity surfaces of the pillar 1. As a result, the foamed products 22a and 22b efficiently fill or close the divided cavities 6a and 6b, thereby providing excellent damping and sound insulation powers to the pillar 1.

In addition, the first and second reinforcement members 10a and 10b are firmly secured in the divided cavities 6a and 6b by the foamed products 22a and 22b. Therefore, the first and second reinforcement members 10a and 10b cooperate with the foamed products 22a and 22b to reinforce the pillar 1, thereby providing sufficient rigidity and strength to the pillar 1.

Further, as shown in FIGS. 3(A) and 3(B), the inner panel 2 of the pillar 1 is formed with a plurality of apertures 32 (one of which is shown) for attaching an ornament or decorative member (not shown) to the pillar 1. However, the possibility that the apertures 32 will be closed by the foamed products 22a is reduced or eliminated, because the reinforcement plates 11a may effectively confine the foamed products 22a within a predetermined limited area in the divided cavity 6a.

In this embodiment, the first and second filling assemblies 30a and 30b are disposed in the first and second divided cavities 6a and 6b of the pillar 1 in the manner described above. However, the present invention is not limited to this structure. For example, the positions of the filling assemblies 30a and 30b can be relatively shifted appropriately upward or downward. Also, only one of these filling assemblies 30a and 30b may be used, if desired.

Additionally, in this embodiment, the foamable pads 21a are positioned on the ends of the reinforcement panel row. However, the positions of the foamable pads 21a can be changed, if desired. Also, the number of the foamable pads 21a and the reinforcement plates 11a may be changed, if desired. The same is true with the foamable pads 21b.

Figure 6:
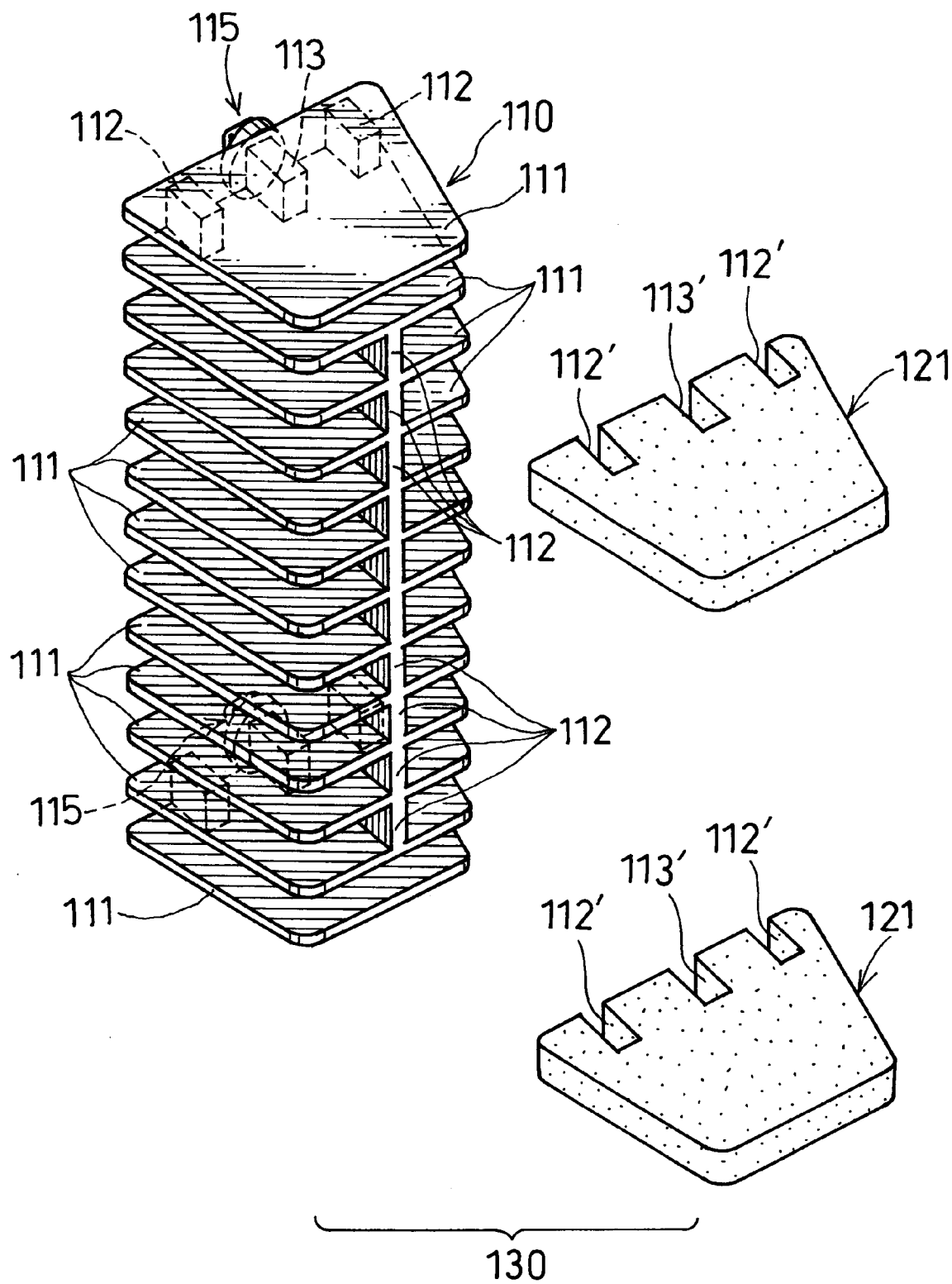
FIG. 6 an exploded perspective view of a reinforcement member and foamable pads used in a structure according to a second embodiment of the present invention.
Figure 7A:
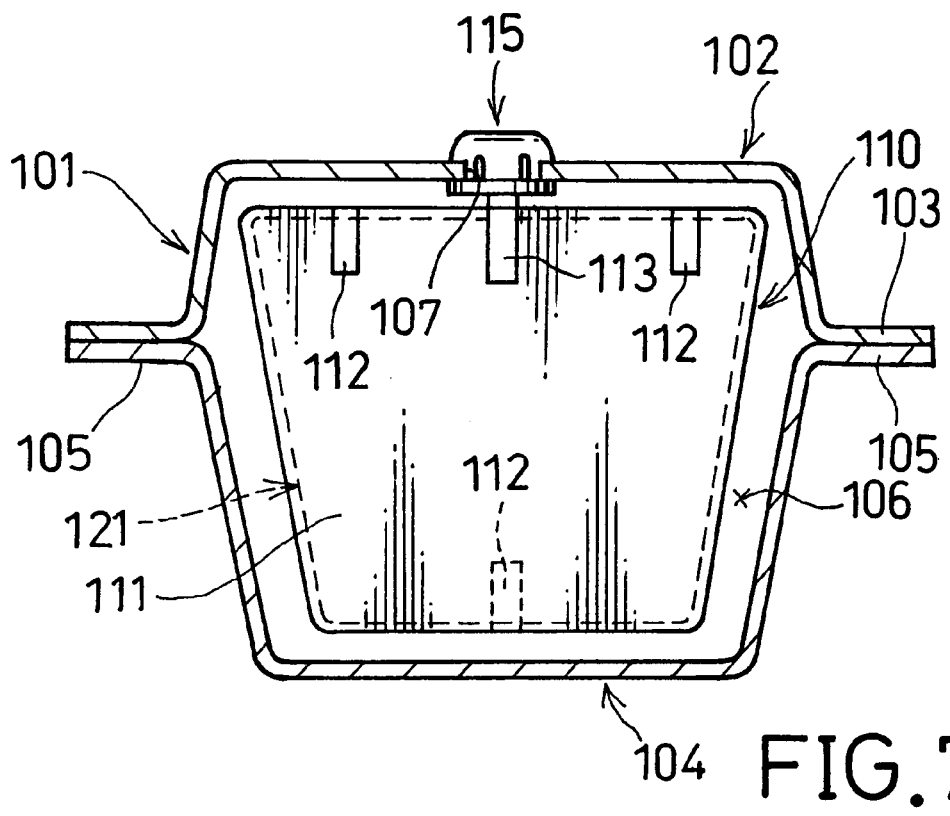
FIG. 7(A) is a transverse sectional view similar to FIG. 4(A), illustrating the structure before the foamable pads are expanded.
Figure 7B:
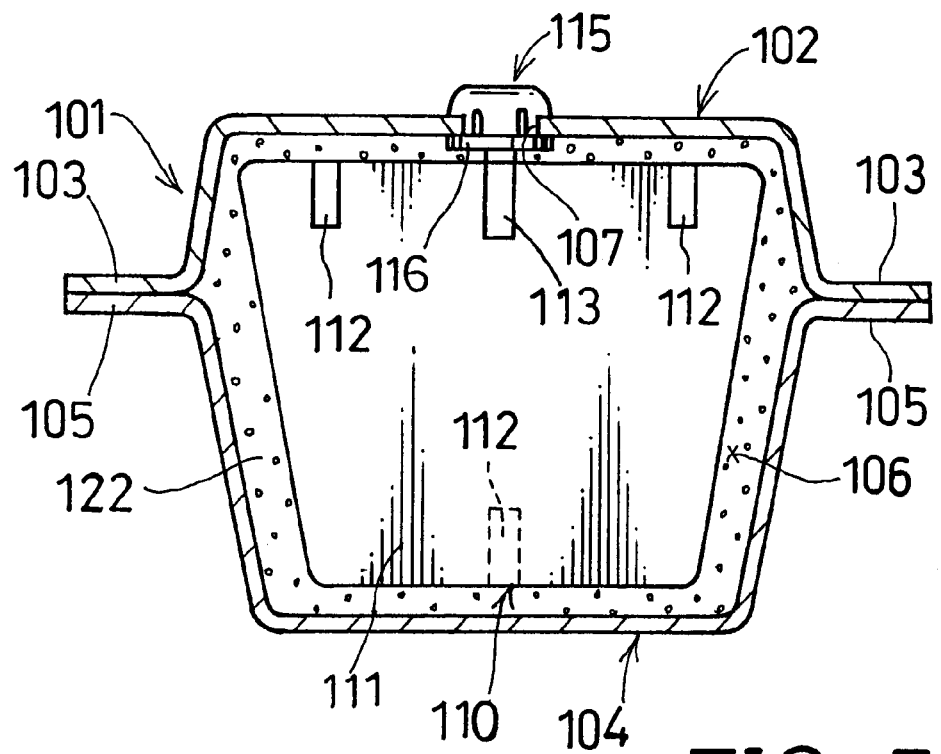
FIG. 7(B) is a transverse sectional view similar to FIG. 4(B), illustrating the structure after the foamable pads are expanded.
Figure 8A:
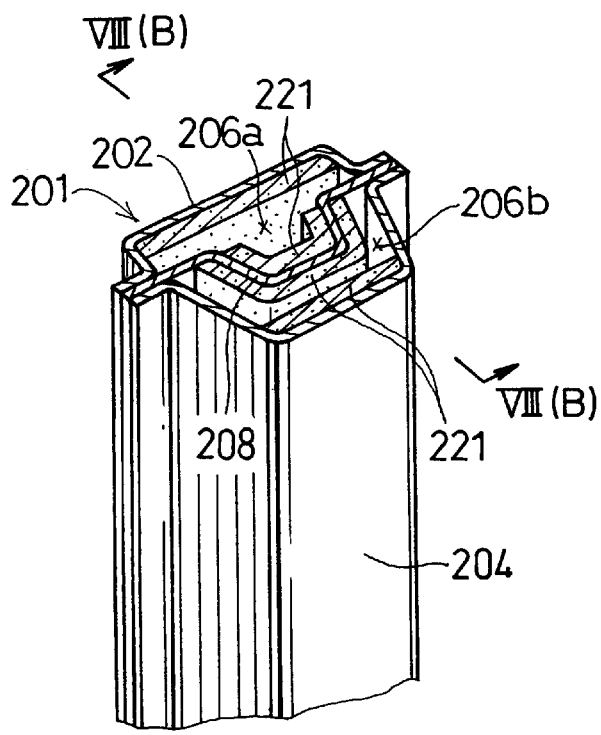
FIG. 8(A) is a perspective view of a conventional structure for closing and reinforcing a hollow structural member, before foamable pads are expanded.
Figure 8B:
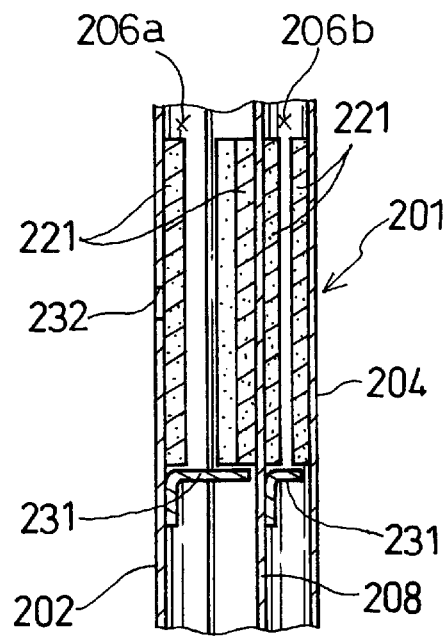
FIG. 8(B) is a sectional view taken along the line VIII(B)—VIII(B) in FIG. 8(A)
Figure 9A:
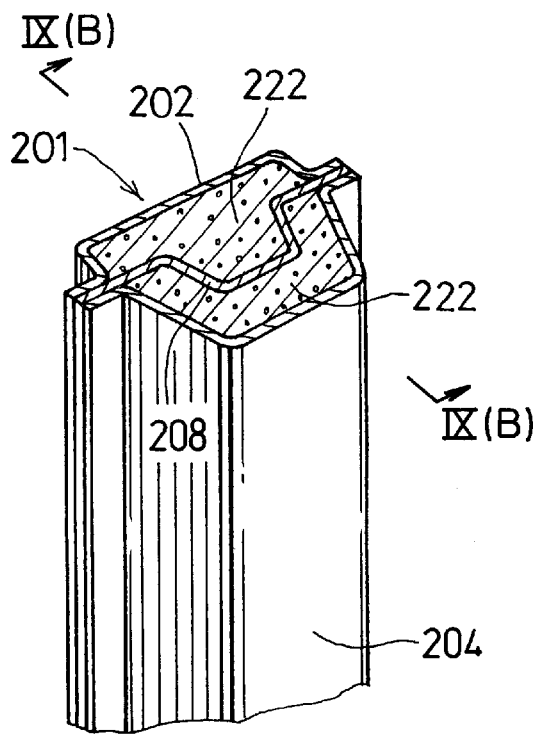
FIG. 9(A) is a perspective view of a conventional structure for closing and reinforcing a hollow structural member, after foamable pads are expanded.
Figure 9B:
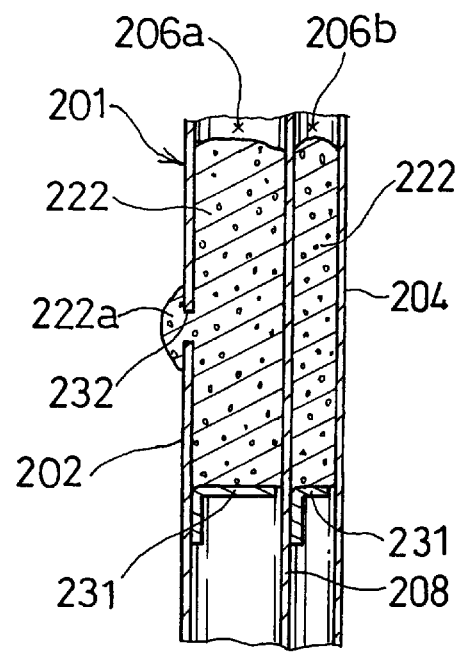
FIG. 9(B) is a sectional view taken along the line IX(B)—IX(B) in FIG. 9(A).

Referring now to FIGS. 6, 7(A) and 7(B), shown therein is a second representative embodiment of the invention that is related to the first embodiment. Therefore, only constructions that are different from those constructions described in the first embodiment will be explained.

As shown in FIGS. 7(A) and 7(B), a pillar 101 of a vehicle body (not shown) is exemplified as a hollow structural member. Unlike the first embodiment, the pillar 101 is constructed from only an elongated inner pillar panel 102 having flanges 103 and an elongated outer pillar panel 104 having flanges 105. The inner and the outer pillar panels 102 and 104 are again preferably welded at the flanges 103 and 105 by spot welding, so that the pillar 101 has a closed box-like hollow shape and has a cavity 106 therein.

As shown in FIGS. 7(A) and 7(B), the inner pillar panel 102 preferably has a pair of apertures 107 (only one of which is shown) into which engagement pins 115 are inserted, as will be hereinafter described. Each aperture 107 may have a desired shape, for example, a rectangular shape, an oval shape or other such shapes. The cavity of the pillar 1 preferably receives a reinforcement member 110 and a pair of foamable pads 121 retained by the reinforcement member 110. The foamable pads 121 retained by the reinforcement member 110 disposed in the cavity 106 may preferably fill or close the cavity 106 when expanded by external heating to produce foamed products 122.

As shown in FIG. 6, the reinforcement member 110 is constructed from a plurality of reinforcement plates 111 arranged in a row, and a plurality of spacers or connecting pieces 112 and 113 interposed between the reinforcement plates 111. The reinforcement plates 111 may be arranged in a parallel or other separate relationship, and may be integrally interconnected with each other by the connecting pieces 112 and 113 to form a plurality of circumferentially opened receiving spaces therebetween. As a result, the reinforcement member 110 may have a series of receiving spaces. As will be apparent, the connecting pieces 113 are two in number, and each connecting piece 113 is disposed between the two reinforcement plates 111 positioned on each end of the reinforcement plate row. Moreover, as shown in FIGS. 7(A) and 7(B), each reinforcement plate 111 preferably is configured to substantially conform to the transverse cross-sectional configuration of the cavity 106, and has an external dimension slightly smaller than the dimension of the transverse cross section of the cavity 106 so as to form a substantial clearance between the periphery of the reinforcement plate 111 and the inner surfaces of the panels 102 and 104.

The reinforcement member 110 may further include engagement pins 115. Each engagement pin 115 preferably is integrally formed on the connecting piece 113, so as to be insertable into the aperture 107 formed on the inner pillar panel 102 when the reinforcement member 110 is disposed on the inner pillar panel 102, as will be hereinafter described. The engagement pin 115 has the same construction as the engagement pins 15a and 15b of the first embodiment. Therefore, no description of the engagement pin 115 is necessary.

The foamable pads 121 preferably are configured to conform to the configuration of the reinforcement plate 111. One of the foamable pads 121 may be received in the receiving space between the two reinforcement plates 111 positioned on one end of the reinforcement plate row in an unfoamed or compressed state, and the other of the foamable pads 121 may be received in the receiving space between the two reinforcement plates 111 positioned on the other end of the reinforcement plate row in an unfoamed or compressed state. As will be recognized, each foamable pad 121 preferably has a thickness equal to or smaller than the distance between the corresponding reinforcement plates 111 so as to fit snugly therebetween. Further, each foamable pad 121 is provided with engagement slits 112' and 113' that are preferably designed to engage the connecting pieces 112 and 113 of the reinforcement member 110 when the foamable pad 121 is received between the reinforcement plates 111.

Like the first and second reinforcement members 10a and 10b of the first embodiment, the reinforcement member 110 thus constructed preferably is integrally formed by injection molding of a heat resistive synthetic resinous material. Similarly, the foamable pads 121 used in this embodiment preferably are made of the same materials as the first and second foamable pads 21a and 21b used in the first embodiment.

Processes for incorporating the reinforcement member 110 and the foamable pads 121 to the pillar 101 and subsequent operations will now be described.

The foamable pads 121 are positioned in an unfoamed or compressed state within the receiving spaces between the corresponding reinforcement plates 111 of the reinforcement member 110 with the slits 112' and 113' engaged with the connecting pieces 112 and 113. Thus, the foamable pads 121 are properly positioned and retained on the reinforcement member 110.

The reinforcement member 110 having the foamable pads 121 (hereinafter "filling device or filling assembly 130") is disposed on the inner side of the inner pillar panel 102 in such a way that the reinforcement plate row of the reinforcement plates 111 aligns with the longitudinal axis of the inner pillar panel 102. Thereafter, the engagement pins 115 provided on the connecting piece 113 of the reinforcement member 110 are inserted into the apertures 107 formed on the inner pillar panel 102. Thus, the reinforcement member 110 is attached to the inner side of the inner pillar panel 102 together with the foamable pads 121.

Subsequently, the inner pillar panel 102 and the outer pillar panel 104 preferably are welded at the flanges 103 and 105 thereof by spot welding to form the pillar 101 having the cavity 106 therein. As will be recognized, the pillar 101 thus formed includes the filling assembly 130 that is encapsulated in the cavity 106. As noted with respect to the first embodiment, the filling assembly 130 may be retained in the cavity 106 without contacting the surfaces of the panels 102 and 104.

Thereafter, the vehicle body having the pillar 101 thus constructed is introduced into a coating bath containing a coating material for dip coating. During dip coating, the coating material coats the outer surface of the pillar 101. As noted in relation to the first embodiment, the coating material introduced into the cavity 106 may be effectively applied to the inner surfaces of the panels 102 and 104. As a result, the coating material may suitably coat the cavity surface of the pillar 101 without producing any un-painted portions thereon.

Thereafter, the vehicle body having the pillar 101 is heated by external heating to bake the coating material as coated, thereby effectively heating, the foamable pads 121 in the cavity 106. As a result, the heated foamable pads 121 expand to produce the foamed products 122.

As shown in FIG. 7(B), when the foamable pads 121 expand by heating, the corresponding reinforcement plates 111 may effectively prevent the foamed products 122 as produced from expanding in the longitudinal direction of the cavity 106. Therefore, the foamed products 122 effectively expand in directions perpendicular to the longitudinal direction of the cavity. Therefore, the foamed products 122 are reliably circumferentially adhered to the cavity surface of the pillar 1. As a result, the cavity 106 is efficiently filled or closed by the foamed products 122.

Again, as noted in relation to the first embodiment, the reinforcement member 110 is firmly secured in the cavity 106 by the foamed products 122. Therefore, the reinforcement member 110 cooperates with the foamed products 122 to reinforce the pillar 101, thereby providing sufficient rigidity and strength to the pillar 101.

In this embodiment, the foamable pads 121 are positioned on the ends of the reinforcement panel row. However, the positions of the foamable pads 121 can be changed, if desired. Also, the number of foamable pads 121 or the reinforcement plates 111 may be changed, if desired.

Moreover, in the first and the second embodiments, the pillar of a vehicle body is exemplified as the hollow structural member. However, the hollow structural member is not limited to the pillar and may be a rocker panel or a roof side panel of a vehicle body. Further, the hollow structural member is not limited to parts of a vehicle body, as the present teachings are equally applicable to the filling or closing and reinforcing of any hollow members.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. In combination:
    a hollow structural member having a longitudinal axis and a cavity therein having an inner surface; and
    a filling device for closing and reinforcing the cavity of the hollow structural member, the filling device comprising:
        a reinforcement member comprising a plurality of reinforcement plates arranged in a spaced relationship, and means for interconnecting the reinforcement plates to form a peripheral clearance between the reinforcement plates and the inner surface of the hollow structural member, the clearance comprising a plurality of contiguous, circumferentially opened receiving spaces, the reinforcement member being disposed in the cavity in such a way that the reinforcement plates are substantially perpendicular to the longitudinal axis of the hollow structural member; and
        at least one foamable member received within the plurality of receiving spaces of the reinforcement member, the foamable member being adapted to close the cavity and to secure the reinforcement member in the cavity when expanded by external heating to produce a foamed product.

2. A structure as defined in claim 1, wherein the reinforcement member comprises a heat resistive synthetic resinous material.

3. A structure as defined in claim 2, wherein the reinforcement member has an attachment member for positioning the reinforcement member in the cavity.

4. A structure as defined in claim 3, wherein the attachment member is integral with the reinforcement member.

5. A structure as defined in claim 4, wherein the attachment member comprises an engagement pin that is adapted to engage an aperture formed in the hollow structural member.

6. In combination:
    a hollow structural member having a longitudinal axis, a cavity having an inner surface and an intervening member disposed in the cavity that is adapted to longitudinally divide the cavity to form a first cavity and a second cavity; and
    a filling device used for closing and reinforcing at least one of the first cavity and second cavity of the hollow structural member, the filling device comprising:
        a reinforcement member comprising a plurality of reinforcement plates arranged in a spaced relationship, the reinforcement plates being interconnected to form a peripheral clearance between the reinforcement plates and the inner surface of the hollow structural member, the clearance comprising a plurality of contiguous, circumferentially opened receiving spaces, the reinforcement member being disposed in at least one of the first and second cavities in such a way that the reinforcement plates are substantially perpendicular to the longitudinal axis of the hollow structural member; and
        at least one foamable member received within the plurality of receiving spaces of the reinforcement member, the foamable member being adapted to close the corresponding divided cavity and to secure the reinforcement member in the divided cavity when expanded by external heating to produce a foamed product.

7. A structure as defined in claim 6, wherein the reinforcement member comprises a heat resistive synthetic resinous material.

8. A structure as defined in claim 7, wherein the reinforcement member has an attachment member for positioning the reinforcement member in the corresponding divided cavity.

9. A structure as defined in claim 8, wherein the attachment member is integral with the reinforcement member.

10. A structure as defined in claim 9, wherein the attachment member comprises an engagement pin that is adapted to engage an aperture formed in the hollow structural member.

11. A method for closing a cavity of a hollow structural member and for reinforcing the hollow structural member which has a longitudinal axis and an inner surface, comprising the steps of:
    disposing a reinforcement member in the cavity, the reinforcement member comprising a plurality of reinforcement plates arranged in a spaced relationship, the reinforcement plates being interconnected to form a peripheral clearance between the reinforcement plates and the inner surface of the hollow structural member, the clearance comprising a plurality of contiguous, circumferentially opened receiving spaces, the reinforcement member being disposed in such a way that the reinforcement plates are substantially perpendicular to a longitudinal axis of the hollow structural member;
    inserting at least one foamable member into the plurality of receiving spaces of the reinforcement member; and
    expanding by external heating the foamable member to produce a foamed product.

12. A filling device adapted to close and reinforce a cavity of a hollow structural member having an inner surface and a longitudinal axis, comprising:
    an elongated reinforcement member having a longitudinal axis and comprising a plurality of reinforcement plates arranged in a spaced relationship and disposed substantially perpendicularly to the longitudinal axis of the member, the reinforcement plates being interconnected and being constructed and arranged to provide a plurality of contiguous, circumferentially opened receiving spaces between the reinforcement plates; and
    at least one foamable member received in the plurality of receiving spaces of the reinforcement member,
    the reinforcement member comprising a heat resistive synthetic resinous material and having an attachment member for positioning the reinforcement member, the attachment member comprising an engagement pin adapted to engage an aperture in the hollow structural member, whereby the filling device may be received within the hollow structural member with the reinforcement plates substantially perpendicular to the longitudinal axis of the filling device, and with a peripheral clearance between the reinforcement plates and the hollow structural member.

13. A filling device defined in claim 12, wherein the at least one foamable member comprises two foamable members, each of the two foamable members being received in the plurality of receiving spaces positioned at opposite ends of the reinforcement member.

14. A filling device as defined in claim 12, wherein the attachment member is integral with the reinforcement member.

* * * * *